United States Patent [19]
Ozaki et al.

[11] Patent Number: 5,801,518
[45] Date of Patent: Sep. 1, 1998

[54] PULSE FREQUENCY MODULATED DC-DC CONVERTER

[75] Inventors: Masaharu Ozaki; Takeshi Naka; Hitoshi Furutachi, all of Chuo-ku, Japan

[73] Assignee: Seiko Instruments Inc., Japan

[21] Appl. No.: 608,484

[22] Filed: Feb. 28, 1996

[30] Foreign Application Priority Data

Feb. 28, 1995 [JP] Japan .................................. 7-078062

[51] Int. Cl.$^6$ .................................................. G05F 1/575
[52] U.S. Cl. ................................................ 323/222; 323/284
[58] Field of Search ................................... 323/222, 282, 323/283, 284, 285

[56] References Cited

U.S. PATENT DOCUMENTS

| | | | |
|---|---|---|---|
| 4,618,812 | 10/1986 | Kawakami | 323/224 |
| 4,835,454 | 5/1989 | White | 323/222 |
| 4,958,121 | 9/1990 | Cuomo et al. | 323/224 |
| 5,166,871 | 11/1992 | Carroll et al. | 323/284 |
| 5,247,239 | 9/1993 | Yamamura et al. | 323/222 |
| 5,329,100 | 7/1994 | Lee | 323/285 |
| 5,335,162 | 8/1994 | Martin-Lopez et al. | 323/285 |
| 5,552,643 | 9/1996 | Morgan et al. | 323/282 |
| 5,594,323 | 1/1997 | Herfurth et al. | 323/222 |
| 5,629,610 | 5/1997 | Pedrazzini et al. | 323/283 |
| 5,631,810 | 5/1997 | Takano | 323/282 |

Primary Examiner—Peter S. Wong
Assistant Examiner—Derek J. Jardieu
Attorney, Agent, or Firm—Adams & Wilks

[57] ABSTRACT

A pulse frequency modulation type DC-DC converter has first and second voltage level comparators for controlling the frequency of a control signal used to drive an output coil. The first voltage comparator detects a first voltage level and the second voltage comparator detects a second voltage level. A reference voltage circuit produces reference voltages corresponding to the first and second voltage levels and provides the reference voltages to the first and second voltage comparators, respectively. An oscillating circuit generates the control signal under control of the first and second comparators. The control signal has one of a first pulse width and a second pulse width depending upon outputs of the first and second voltage comparators for controlling a switching device used for driving an output coil. The switching device is turned on to drive the output coil during a first pulse width when the first voltage comparator detects that the output voltage coincides with the first voltage level. The switching device is turned on to drive the output coil during a second pulse width when the second voltage comparator detects that the output voltage coincides with the second voltage level. Thus, outputs from the first and second voltage comparators determine the frequency of the control signal by controlling the pulse width of respective pulses of the control signal.

17 Claims, 14 Drawing Sheets

F I G. 1 5
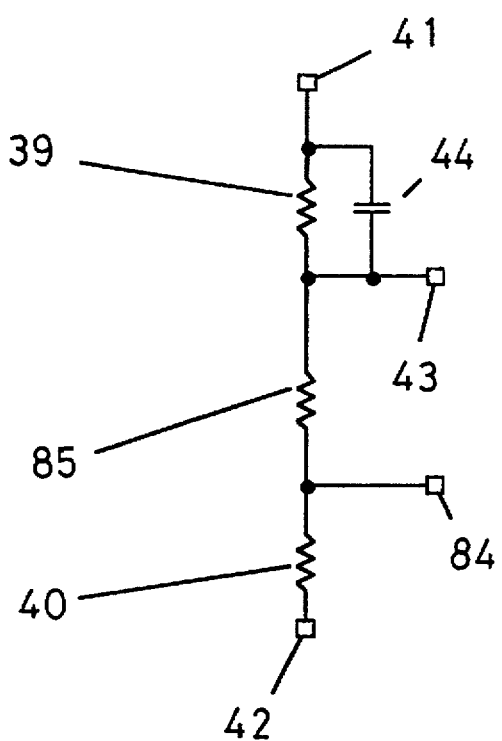

F I G. 1 8

| | | | AT THE PEAK OF OUTPUT VOLTAGE OF DC-DC CONVERTER | | MINIMUM OFF-PERIOD | | COIL CURRENT DRIVE SWITCHING TRANSISTOR |
|---|---|---|---|---|---|---|---|
| | | | OUTPUT OF FIRST VOLTAGE COMPARATOR | OUTPUT OF SECOND VOLTAGE COMPARATOR | OUTPUT OF FIRST VOLTAGE COMPARATOR | OUTPUT OF SECOND VOLTAGE COMPARATOR | OUTPUT OF SECOND VOLTAGE COMPARATOR |
| STATE 1 | CASE 1 | | LOW LEVEL | LOW LEVEL | HIGH LEVEL | HIGH LEVEL | HIGH LEVEL |
| | CASE 2 | | LOW LEVEL | LOW LEVEL | HIGH LEVEL | LOW LEVEL | HIGH LEVEL |
| | CASE 3 | | LOW LEVEL | LOW LEVEL | HIGH LEVEL | LOW LEVEL | LOW LEVEL |
| | CASE 4 | | LOW LEVEL | LOW LEVEL | LOW LEVEL | LOW LEVEL | HIGH LEVEL |
| | CASE 5 | | LOW LEVEL | LOW LEVEL | LOW LEVEL | LOW LEVEL | LOW LEVEL |
| STATE 2 | CASE 1 | | HIGH LEVEL | LOW LEVEL | HIGH LEVEL | HIGH LEVEL | HIGH LEVEL |
| | CASE 2 | | HIGH LEVEL | LOW LEVEL | HIGH LEVEL | LOW LEVEL | HIGH LEVEL |
| | CASE 3 | | HIGH LEVEL | LOW LEVEL | HIGH LEVEL | LOW LEVEL | LOW LEVEL |
| STATE 3 | — | | HIGH LEVEL | HIGH LEVEL | HIGH LEVEL | HIGH LEVEL | HIGH LEVEL |

PULSE FREQUENCY MODULATED DC-DC CONVERTER

BACKGROUND OF THE INVENTION

The present invention relates generally to an IC device and, more particularly, to an IC device used to constitute a pulse frequency modulation type DC-DC converter. The IC contains a control unit, and is provided with an external or internal switching transistor and a diode for driving a coil. The IC is connected externally to the coil, along with a capacitor, and a transistor along with an optional resistor, capacitor, and other components according to the aforementioned adjustment functions.

Generally, a conventional pulse frequency modulation type DC-DC converter is controlled by a pulse of a certain width. In such a case, the DC-DC converter operates in a stable condition with a relatively small ripple in output voltage by reducing a duty ratio which indicates a ratio of the pulse width during which a coil current is driven to one period of the pulse signal. However, an output current of the DC-DC converter is seriously limited to a small value as compared to the case where the duty ratio is set large to drive the coil. On the other hand, if the duty ratio is made large, the coil can store a great energy during one coil driving pulse to thereby disadvantageously increase a ripple of the output voltage as compared to the case where the output current is reduced. Furthermore, if the width of the coil driving pulse is prolonged, a peak value of the coil current increases to thereby raise a peak value of an electric current flowing through a coil current switching transistor. Accordingly, the DC-DC converter suffers from a poor energy conversion rate due to power loss by an on-resistance of the coil current drive switching transistor.

Also, in cases when output voltage is relatively close to an input voltage, balance worsens between the period in which the coil stores an energy and a feedback period in which the energy stored in the coil is transmitted to the output side of the DC-DC converter. Accordingly, the energy is not efficiently transmitted to the output side although the coil stores sufficient energy. The output voltage does not increase while the coil drive pulses continue to output. Over a critical point, the coil drive pulse stops so that the energy continuously stored in the coil is instantly transmitted to the output side, thereby disadvantageously creating an abnormally great ripple of the output voltage of the DC-DC converter. Furthermore, this phenomenon causes an abnormally great peak current to flow through the coil current drive switching transistor to generate power loss due to the on-resistance of the coil current drive switching transistor, thereby seriously hindering the energy conversion rate of the DC-DC converter in addition to the increase in the ripple of the output voltage of the DC-DC converter.

SUMMARY OF THE INVENTION

In order to solve the above-noted drawbacks of the prior art according to the invention, a DC-DC converter is provided which comprises a first voltage comparator for detecting a first voltage level, a second voltage comparator for detecting a second voltage level, a reference voltage circuit, an oscillating circuit, an output voltage level feedback circuit, a buffer circuit and a coil current drive switching transistor. The coil current drive switching transistor is turned on to drive a coil current to control an output voltage during a first pulse width when the first voltage comparator detects that the output voltage or a voltage corresponding to the output voltage passing through the output voltage feedback circuit corresponds to the first voltage level, and wherein the coil current drive switching transistor is turned on to drive a coil current to control an output voltage during a second pulse width when the second voltage comparator detects that output voltage or a voltage corresponding to the output voltage passing through the output voltage feedback circuit corresponds to the second voltage level. In such a manner, the output voltage is controlled by changing the pulse width according to the degree of decrease in the absolute value of the output voltage. Consequently, the invention realizes a DC-DC converter having a reduced ripple in the output voltage, a great current generation capacity and a highly efficient energy conversion rate.

BRIEF DESCRIPTION OF THE DRAWINGS

FIG. 15 is a circuit diagram of an output voltage feedback circuit used in embodiment 3 of the invention;

FIG. 18 is a list table showing various cases of various states observed in the embodiment 1 of the invention.

DETAILED DESCRIPTION OF EMBODIMENTS

Next, a description is given for embodiments of the invention.

Figure 1:
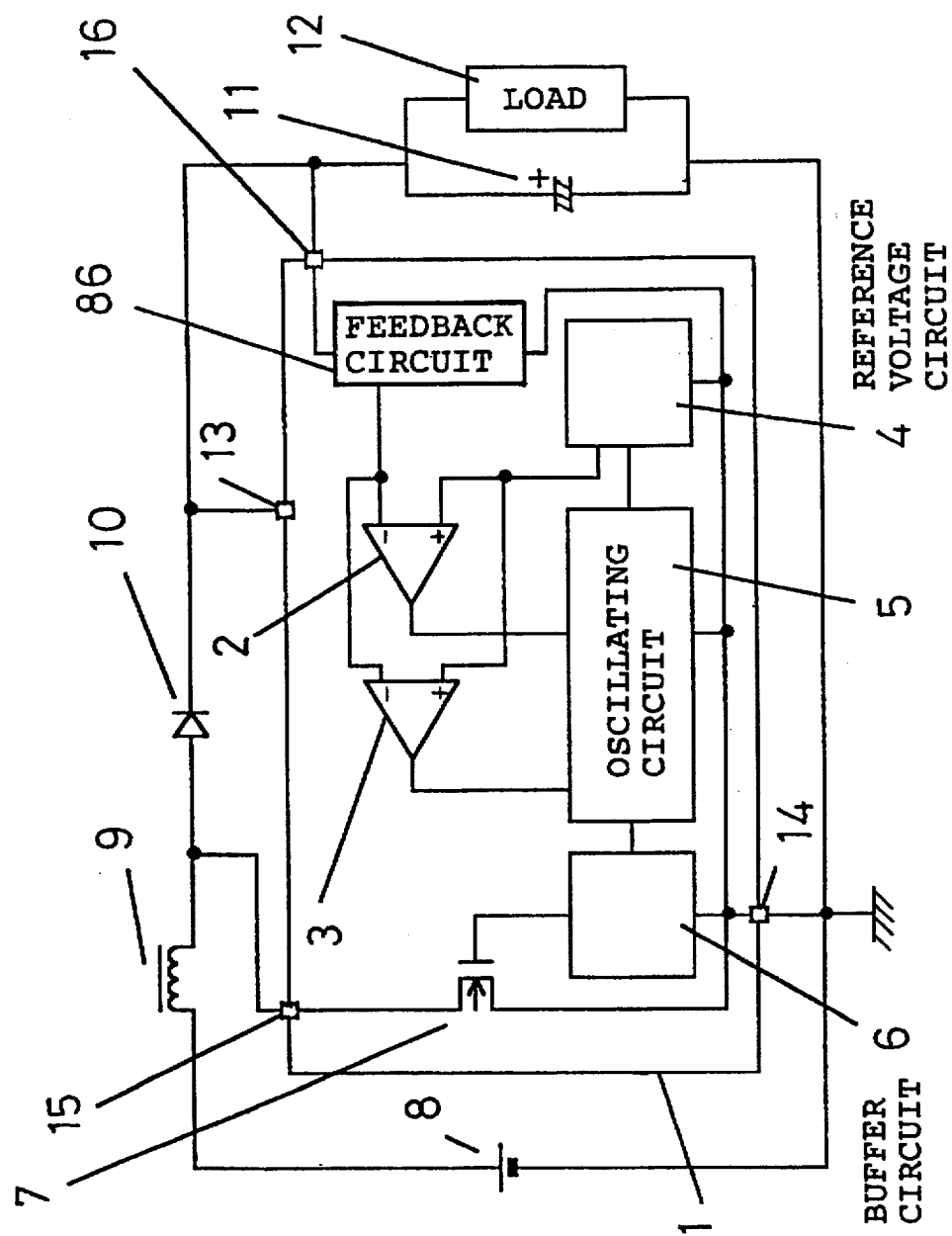
FIG. 1 is an overall circuit diagram of embodiment 1 according to the invention.

Embodiment 1:

FIG. 1 is a circuit diagram of embodiment 1 of the present invention. The DC-DC converter comprises a coil current driving IC, a first voltage comparator 2, a second voltage comparator 3, a reference voltage circuit 4, an oscillating circuit 5, a buffer circuit 6, a coil current drive switching transistor 7, a voltage source 8, a coil 9, a diode 10, a capacitor 11, a load 12, a voltage supply terminal 13 of the IC, a ground terminal 14 of the IC, an output terminal 15 of the coil current drive IC, an output voltage feedback terminal 16 of the IC, and an output voltage feedback circuit 86. In the circuit of embodiment 1 shown in FIG. 1, one terminal of the coil 9 is connected to the positive output terminal of the power source 8. The other terminal of the coil 9 is connected to an anode terminal of the diode 10, and to a drain terminal of the coil drive switching transistor 7 through the output terminal 15 of the coil current drive IC. A cathode terminal of the diode 10 is connected to the power source terminal 13 of the IC, the output voltage feedback terminal 16 of the IC, one terminal of the capacitor 11 and one terminal of the load 12. The ground is connected to the other terminal of the load 12, another terminal of the capacitor 11, the ground terminal 14 of the IC, a source terminal of the coil drive switching transistor 7 and the negative terminal of the power source 8.

Figure 2:
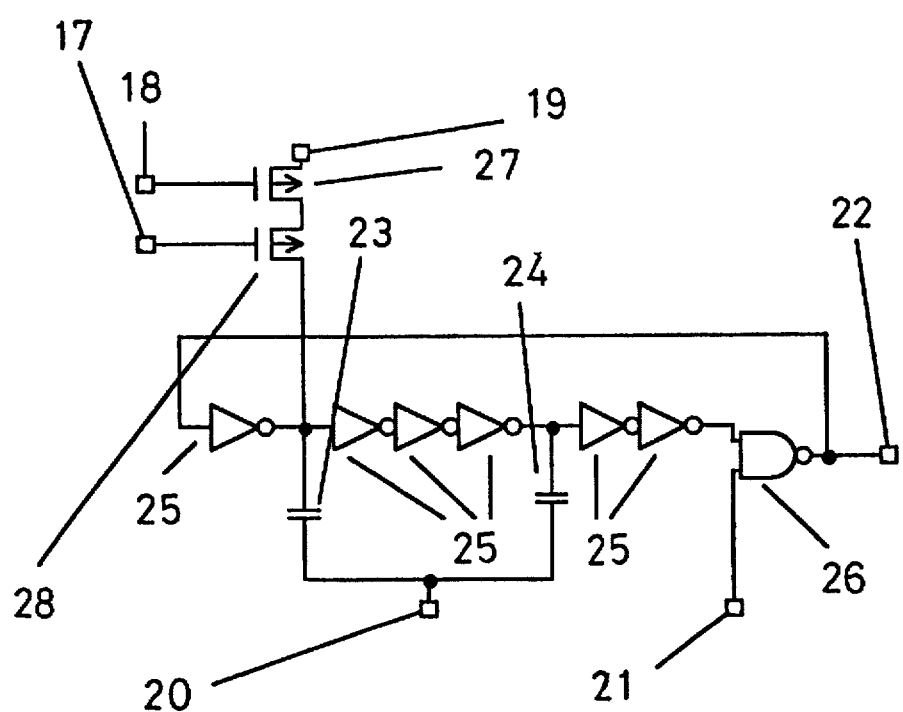
FIG. 2 is a circuit diagram of an oscillating circuit contained in embodiment 1 of the invention.

FIG. 2 is a circuit diagram of the oscillating circuit 5 contained in the embodiment 1 of the invention. The circuit includes a second voltage comparator output connecting terminal 17, a current bias output connecting terminal 18, a power source terminal 19 of the oscillating circuit, a ground terminal 20 of the oscillating circuit, a first voltage comparator output connecting terminal 21, an output terminal 22 of the oscillating circuit, an on-time setting capacitor 23, an off-time setting capacitor 24, constant current inverters 25, a NAND gate 26, a first P channel transistor 27, and a second P channel transistor 28. In FIG. 2, the oscillating circuit comprises six constant current inverters 25 and one NAND gate 26, which are connected in a ring to constitute a ring oscillator. The on-time setting capacitor 23 is connected between one output of the last constant current inverter 25 and the ground terminal 20 of the oscillating circuit. Furthermore, the first and the second P channel transistors 27, 28 are connected in series between the output of this last constant current inverter 25 and the power source terminal 19 of the oscillating circuit. Moreover, the off-time setting capacitor 24 is connected between an output of an intermediate constant current inverter 25 and the ground terminal 20 of the oscillating circuit. The oscillating circuit of FIG. 2 starts operating when a high level signal is input to an input terminal connected to the first voltage comparator output connecting terminal 21, to generate a low level pulse at the output terminal 22 of the oscillating circuit. Further, the low level pulse width of the signal output from the output terminal 22 of the oscillating circuit is controlled by the on-time setting capacitor 23 and by a signal input at the second voltage comparator output connecting terminal 17. A minimum width of a high level pulse output from the output terminal of the oscillating circuit is controlled by the off-time setting capacitor 24.

Figure 7:
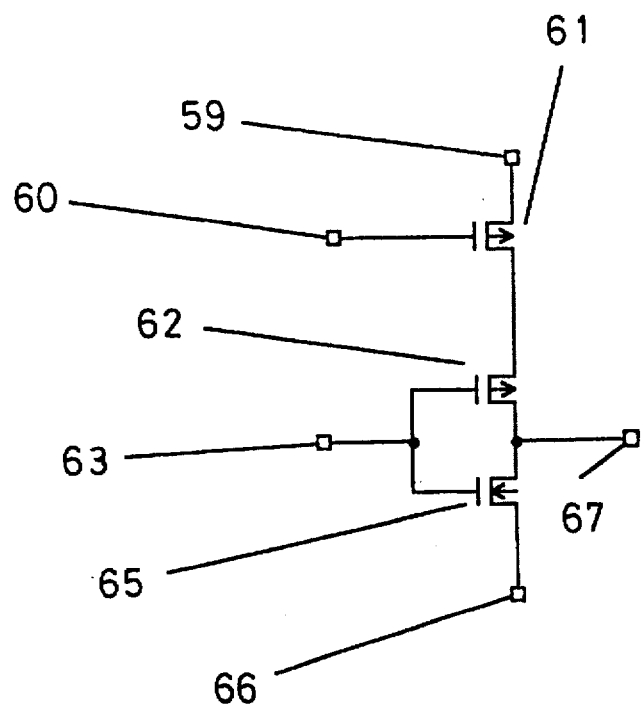
FIG. 7 is a circuit diagram of a constant current inverter contained in embodiment 1 of the invention.

FIG. 7 is a circuit diagram of the constant current inverter 25 contained in the oscillating circuit 5 of the embodiment 1 of the invention. The inverter comprises a power supply terminal 59, a bias input terminal 60, a first P channel transistor 61, a second P channel transistor 62, an input terminal 63, and N channel transistor 65, a ground terminal 66, and an output terminal 67. The power supply terminals of all constant current inverters are connected to the power supply terminal of the oscillating circuit. The ground terminals of all constant current inverters are connected to the ground terminal of the oscillating circuit. The first and second P channel transistors 61, 62 and the N channel transistor 65 are connected in series between the power supply terminal 59 and the ground terminal 66 of the constant current inverter. A gate of the first P channel transistor 61 of the constant current inverter is connected to the current bias output connecting terminal of the oscillating circuit through the bias input terminal 60. Furthermore, the gate of the transistor 61 is connected to a current bias output terminal of the reference votage circuit 4 within the IC. Therefore, the gate of the first P channel transistor 61 receives a constant bias voltage so as to control an electric current flowing through the P channel transistor 61 at a constant value. Consequently, the constant current inverter sets a low level at the output terminal 67 when the input terminal 63 receives a high level signal in a manner similar to a regular inverter. On the other hand, the output terminal 67 turns to a high level when the low level signal is fed to the input terminal 63. In such a case, the current of the first P channel transistor 61 is controlled so that a transition time at the output terminal 67 from the low level to the high level is freely set by a capacitor connected between the output terminal 67 and the ground terminal 66 of the constant current inverter and by the controlled current flowing through the first P channel transistor 61. Furthermore, the size of the first P channel transistor 61 is altered to control the inversion voltage of the constant current inverter. Moreover, the second P channel transistor 62 may be eliminated.

Returning to FIG. 2, the transition time from the low level to the high level at the output terminal of the last constant current inverter 25 is further controlled by injecting a current into the output of the last constant current inverter 25 through the first and second P channel transistors 27, 28 in the oscillating circuit of FIG. 2. In the oscillating circuit of FIG. 2, the second voltage comparator output connecting terminal 12 receives a low level signal to turn on the second P channel transistor 28. Consequently, the current flows into the output of the last constant current inverter 25 through the first and second P channel transistors 27 and 28 to rapidly charge the on-time setting capacitor 23. Consequently, the output terminal 22 of the oscillating circuit produces a pulse haing a shortened low level pulse width. Namely, the low level pulse width at the oscillating circuit output terminal 22 is determined by the on-time setting capacitor 23, while the minimum high level pulse width of the oscillating circuit output terminal 22 is determined by a time for charging the off-time setting capacitor 24 to a threshold voltage of a subsequent constant current inverter 25. Furthermore, the highest oscillating frequency of the oscillating circuit is determined by the sum of the low level pulse width and the minimum high level pulse width at the output terminal 22. The gate of the first P channel transistor 27 is supplied with the constant bias voltage from the reference voltage circuit through the terminal 18, similar to the first P channel transistor 61 of the constant current inverter. The oscillating circuit of FIG. 2 uses a plurality of the constant current inverters 25. A size of the transistors constituting the respective constant current inverters 25 may be separately adjusted to ensure the optimum operation of the oscillating circuit.

Figure 3:
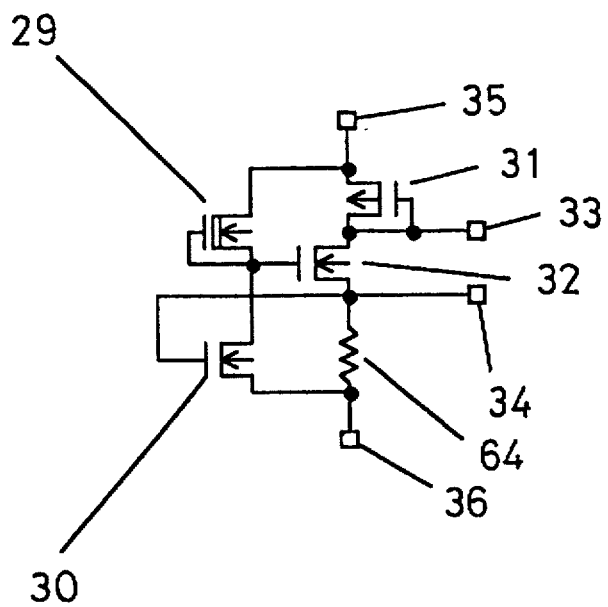
FIG. 3 is a circuit diagram of a reference voltage circuit contained in embodiment 1 of the invention.

FIG. 3 is a circuit diagram of the reference voltage circuit 4 used in embodiment 1 of the invention. The circuit 4 comprises a first N channel transistor 29, a second N channel transistor 30, a P channel transistor 31, a third N channel transistor 32, a current bias output terminal 33, a reference voltage output terminal 34, a power supply terminal 35, a ground terminal 36 and a first resistor 64. In FIG. 3, a group of the first and second N channel transistors 29, 30 are connected in series between the power supply terminal 35 and the ground terminal 36 of the reference voltage circuit. Another group of the P channel transistor 31, the third N channel transistor 32 and the first resistor 64 are also connected in series between the power supply terminal 35 and the ground terminal 36. The first N channel transistor 29 is a depletion type, and a gate and a source thereof are connected to each other. A gate of the third N channel transistor 32 is connected to a source and a gate of the first N channel transistor 29. A gate of the P channel transistor 31 is connected to a drain of the first N channel transistor 29, and to a drain of the third N channel transistor 32. The reference voltage circuit of FIG. 3 produces a constant reference voltage at the reference voltage output terminal 34, and a gate bias voltage of the P channel transistor 61 of the constant current inverters at the current bias output terminal 33. The P channel transistor 31 receives the gate voltage bias voltage at its own gate so as to flow the constant current. Furthermore, a value of the constant current is freely controlled by setting a channel length and a channel width of the P channel transistor 31 which receives the gate bias voltage at its own gate. A detailed description of the operation of the reference voltage circuit in FIG. 3 is given in the Japanese Patent Application filed by D.V.E. on Jul. 15, 1994.

Figure 4:
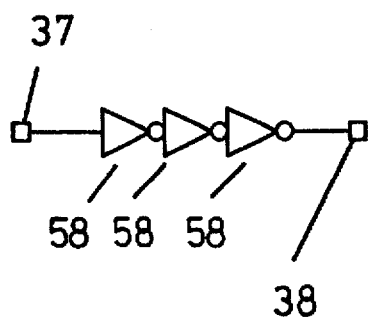
FIG. 4 is a circuit diagram of a buffer circuit contained in embodiment 1 of the invention.

FIG. 4 is a circuit diagram of buffer circuit 6 used in embodiment 1 of the invention. The buffer circuit 6 includes an input terminal 37, an output terminal 38, and inverters 58. The buffer circuit of FIG. 4 is comprised of a plurality of the inverters 58. Its stage number is odd in embodiment 1. Namely the output terminal 38 of the buffer circuit produces a signal which is inverted relative to an input signal fed to the input terminal 37 of the buffer circuit. Therefore, in embodiment 1, when the output of the oscillating circuit 5 turns to the low level, the signal fed from the output terminal 38 of the buffer circuit 6 turns to the high level effective to turn on the coil current drive switching transistor 7. The channel length and with of the transistors of the inerters 58 constituting the buffer circuit is suitably set according to an input capacity of the coil current drive switching transistor 7 connected subsequently to the buffer circuit.

Figure 5:
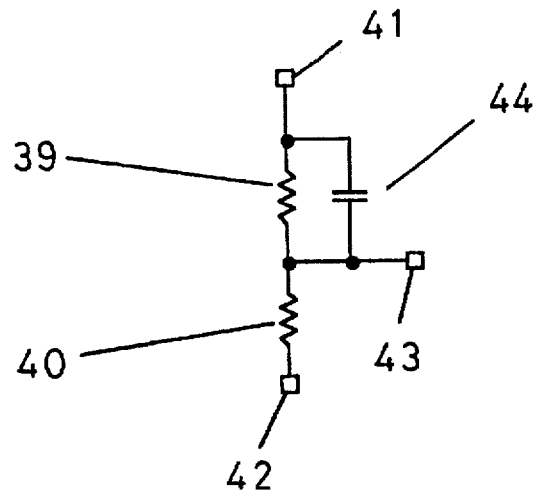
FIG. 5 is a circuit diagram of an output voltage feedback circuit contained in embodiment 1 of the invention.

FIG. 5 is a circuit diagram of the output voltage feedback circuit 86 used in embodiment 1 of the invention. The feedback circuit includes a first feedback resistor 39, a second feedback resistor 40, an input terminal 41, a ground terminal 42, an output terminal 43, and a voltage feedback capacitor 44. The output voltage of the DC-DC converter is divided by the first and second feedback resistors 39, 40 to provide at the output terminal 43 a voltage proportional to the output voltage of the DC-DC converter. The voltage feedback capacitor 44 is optionally added to quickly transmit variation of the output voltage of the DC-DC converter to the output terminal 43 of the output voltage feedback circuit. The value of the feedback capacitor 44 is suitably set according to response of the DC-DC converter.

Figure 6:
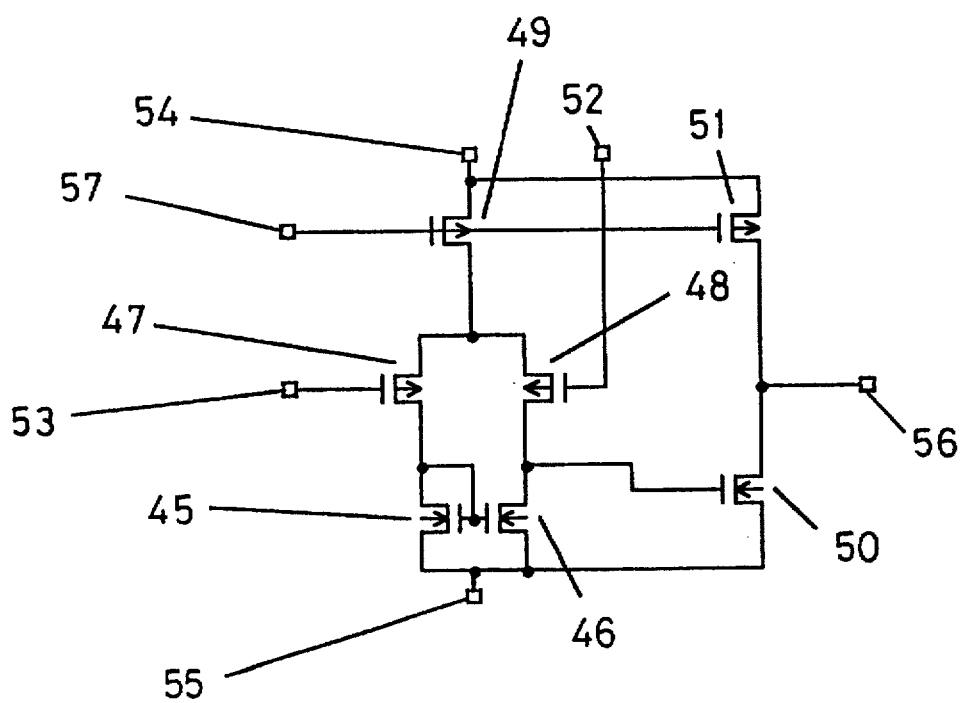
FIG. 6 is a circuit diagram of a voltage comparator contained in embodiment 1 of the invention.

FIG. 6 is a circuit diagram of the voltage comparator 2 or 3 provided in embodiment 1 of the invention. The voltage comparator includes a first N channel transistor 45, a second N channel transistor 46, a first P channel transistor 47, a second P channel transistor 48, a third P channel transistor 49, a third N channel transistor 50, a fourth P channel transistor 51, a non-inverted input terminal 52, an inverted input terminal 53, a power supply terminal 54, a ground terminal 55, an output terminal 56, and a bias input terminal 57. The voltage comparator of FIG. 6 has a general circuit construction. The voltage comparator of FIG. 6 is utilized as the first and second voltage comparators 2 and 3 shown in FIG. 1. In the first voltage comparator 2, the first P channel transistor 47 and the second P channel transistor 48 have the same channel length and width which determines elctroconductivity of these transistors 47, 48. However, in the second voltage comparator 3, the channel length and width of the transistors 47, 48 are differently set such that the electroconductivity of the first P channel transistor 47 is smaller than that of the second P channel transistor 48. Consequently, the second voltage comparator 3 carries out inversion operation when the inverted input voltage is slightly lower than the non-inverted input voltage by several mili-volts to several tens of mili-volts.

A description is given hereinbelow for the connection between the entire circuit block shown in FIG. 1 and the respective circuit blocks shown in FIGS. 2–6. Inside the IC, the output voltage feedback terminal 16 is connected to the input terminal of the output voltage feedback circuit 86. The output terminal of the output voltage feedback circuit 86 is connected to the inverted input terminal of the first voltage comparator 2, and to the inverted input terminal of the second voltage comparator 3. The reference voltage output terminal of the reference voltage circuit 4 is connected to the non-inverted input terminal of the first voltage comparator 2, and to the non-inverted input terminal of the second voltage comparator 3. The current bias output terminal of the reference voltage circuit 4 is connected to the current bias output connection terminal of the oscillating circuit 5, and to the bias input terminals of the first and second voltage comparators 2 and 3. The output terminal of the first voltage comparator 2 is connected to the first voltage comparator output connecting terminal of the oscillating circuit. The output terminal of the second voltage comparator 3 is connected to the second voltage comparator output connecting terminal of the oscillating circuit 5. The output terminal of the oscillating circuit 5 is connected to the input terminal of the buffer circuit 6. The output terminal of the buffer circuit 6 is connected to the gate terminal of the coil current drive switching transistor 7. Furthermore, the power supply terminal 13 of the IC is connected to the power supply terminals of the reference voltage circuit 4 and the oscillating circuit 5, and to the power supply lines of other circuits such as the buffer circuit 6, the constant current inverters and the voltage comparators 2, 3 contained in the IC. The ground terminal 14 of the IC is connected to the ground terminals of the reference voltage circuit 4, the oscillating circuit 5 and the output voltage feedback circuit 86, and to the ground lines of other circuits such as the buffer circuit 6, the voltage comparators 2, 3 and the constant current inverters contained in the IC.

In embodiment 1 of the invention, the voltage proportional to the output voltage of the DC-DC converter is transmitted through the output voltage feedback circuit 86 to the first and second voltage comparators 2 and 3. On the other hand, the constant reference voltage is supplied from the reference voltage circuit 4 to the first and second voltage comparators 2 and 3. Consequently, when the voltage proportional to the output voltage of the DC-DC converter approaches the reference voltage, the first voltage comparator 2 undergoes an inversion operation and then the second voltage comparator 3 undergoes an inversion operation like the first voltage comparator 2.

A description is first given for the case where the DC-DC converter produces a relatively small output current which flows into the load 12. The capacitor 11 is discharged by the output current of the DC-DC converter so that the output voltage of the DC-DC converter gradually decreases. In this case, the output of the first voltage comparator 2 is initially inverted to a high level from a low level, because the first voltage comparator 2 has an inversion voltage which is set higher than that of the second voltage comparator 3. When the output of the first voltage comparator 2 turns to the high level, the oscillating circuit 5 starts operation to output a low level pulse from the oscillating circuit output terminal 22, because an input of the NAND gate of the oscillating circuit 5 connected to the output terminal of the first comparator 2 turns to the high level. When the output of the oscillating circuit 5 turns to the low level, the output of the buffer circuit 6 turns to the high level. Consequently, the coil current drive switching transistor 7 is turned on so that the current of the coil 9 increases to accumulate energy in the coil 9. In case that the output current of the DC-DC converter is relatively small, the output voltage of the DC-DC converter has a small degree of lowering variation. Accordingly, the output voltage of the DC-DC converter does not fall to a level at which the second voltage comparator 3 inverts. Consequently, the low level pulse of the oscillating circuit 5 has a fixed narrow width. Namely, the output of the second comparator 3 is held at the low level to turn on the second P channel transistor of the oscillating circuit 5. Accordingly, the on-time setting capacitor of the oscillating circuit 5 is charged by the sum of the currents flowing through of the constant current inverter, the first P channel transistor 27 and the second P channel transistor 28. The on-time setting capacitor 23 is charged up more quickly than the case where the second P channel transistor 28 is turned off, to thereby shorten the on-time. Consequently, the pulse width is made short to turn on the coil current drive switching transistor 7. This fixed narrow pulse width is labeled "low level pulse 1". After passing the duration of this pulse width, the output of the oscillating circuit 5 returns to the high level to turn off the coil current drive switching transistor 7. When the coil current drive switching transistor 7 is turned off, the energy stored in the coil 9 is fed to the capacitor 11 through the diode 10. Namely, the charge stored in the capacitor 11 increases so that the output voltage of the DC-DC converter rises. When the output voltage of the DC-DC converter rises, the output of the first voltage comparator 2 is inverted from the high level to the low level. The charge once stored in the capacitor 11 is gradually discharged as the time passes by the output current of the DC-DC converter. When the output voltage of the DC-DC converter falls to the level at which the first voltage comparator 2 inverts, the first voltage comparator 2 inverts once again to repeat the operation described above. The output voltage of the DC-DC converter decreases as the output current of the DC-DC converter increases. Therefore, a density of the low level pulse at the output terminal of the oscillating circuit 5, that is the oscillating frequency of the oscillating circuit 5, increases as the output current of the DC-DC converter increases. Namely, the oscillating circuit 5 outputs a train of pulses having the fixed narrow low level pulse width 1. Furthermore, the interval of the pulses is shortened as the DC-DC converter increases the output current. Namely, the coil current drive switching transistor 7 is turned on to enable the coil 9 to store the energy at a constant duration per one time. However, the duration of the off-period of the coil current drive switching transistor 7 is made short as the DC-DC converter increases the output current. Consequently, a mean value of the output voltage of the DC-DC converter is held constant. In this operation, the coil current drive switching transistor 7 has an on-period corresponding to the fixed narrow width of the pulse 1. Therefore, the DC-DC converter creates a small ripple of the output voltage. However, the increase of the oscillating frequency stops when the period of the oscillating frequency reaches the sum of the constant value of the low level pulse width and the minimum value of the high level pulse width.

Figure 8:
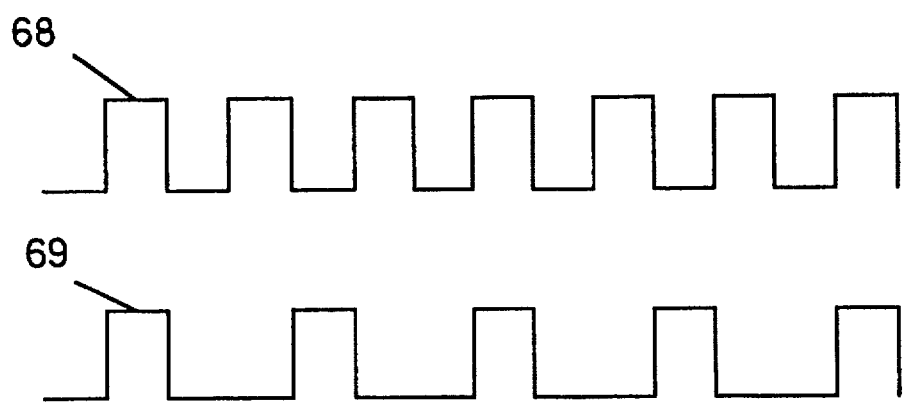
FIG. 8 is an output waveform diagram in embodiment 1 of the invention.

FIG. 8 shows two kinds of waveforms 68 and 69. The first waveform 68 schematically shows an output voltage of the oscillating circuit when the oscillating frequency reaches the highest value. In FIG. 8, the horizontal axis denotes time and the vertical axis denotes voltage.

When the DC-DC converter further increases the output current after the oscillating frequency of the oscillating circuit 5 reaches the maximum value, the output voltage of the DC-DC converter falls to a level at which the second voltage comparator 3 inverts. When the output of the second voltage comparator 3 is inverted to the high level, the gate voltage level of the second P channel transistor of the oscillating circuit 5 turns to the high level so that the transistor is turned off. Consequently, the on-time setting capacitor 23 of the oscillating circuit 5 is supplied with only the sum of the currents flowing through the first and second P channel transistors 61, 62 of the constant current inverter 25. Therefore, the oscillating circuit produces a signal with a relatively long low level pulse width at the output terminal.

The low level pulse width output from the oscillating circuit 5 depends on a timing point at which the second voltage comparator 3 inverts. The output voltage of the DC-DC converter rises once when the energy stored in the coil 9 is fed to the capacitor 11 through the diode 10 by the off operation of the coil current drive switching transistor 7. Thereafter, the output voltage of the DC-DC converter continues to fall until the energy is again fed to the capacitor 11 from the coil 9. Since the energy stored in the coil 9 is fed to the capacitor 11 at a definite time interval, the output voltage of the DC-DC converter reaches a peak value at a certain time during the off-period of the coil current drive switching transistor 7.

Namely, provided that the output current of the DC-DC converter is fixed to a certain value, the output voltage of the DC-DC converter reaches the peak value immediately after the energy is fed to the capacitor 11 from the coil 9 through the diode 10. There are several states in this case. Hereinafter, a description is given for each case. First, the state 1 is such that both the first and second voltage comparators 2 and 3 concurrently invert from the high level to the low level. The state 2 is such that the output of the second voltage comparator 3 inverts from the high level to the low level while the output of the first voltage comparator 2 is held at the high level. The state 3 is such that outputs of both the first and second voltage comparators 2 and 3 are held at the high level.

After the output voltage of the DC-DC converter reaches the peak value, the output voltage of the DC-DC converter decreases as the time passes depending on the output current of the DC-DC converter as described repeatedly above. Furthermore, the coil current drive switching transistor 7 is placed in the off-state for a certain period even after the oscillating frequency of the oscillating circuit 5 reaches the maximum value. The minimum off-period is defined as the minimum period during which the coil current drive switching transistor 7 is turned off. There are several cases under the state 1. Hereinafter, a description is given for each case. The case 1 of state 1 is such that both the outputs of the first and second voltage comparators 2 and 3 concurrently invert to the high level from the low level due to a decrease of the output voltage of the DC-DC converter within the minimum off-period. The case 2 of the state 1 is such that only the output of the first voltage comparator 2 inverts from the low level to the high level within the minimum off-period due to a decrease of the output voltage of the DC-DC converter created within the minimum off-period, and then the second voltage comparator 3 inverts from the low level to the high level while the coil current drive switching transistor 7 is turned on when the oscillating circuit 5 outputs the low level signal. The case 3 of the state 1 is such that only the first voltage comparator 2 inverts from the low level to the high level within the minimum off-period while the second voltage comparator 3 is held at the low level even when the coil current drive switching transistor 7 is turned on. The case 4 of the state 1 is such that both the first and second voltage comparators 2 and 3 are held at the low level within the minimum off-period, then the output of the first voltage comparator 2 inverts from the low level to the high level due to a decrease of the output voltage of the DC-DC converter within the minimum off-period, and thereafter the second voltage comparator 3 inverts from the high level to the low level while the coil current drive switching transistor 7 is turned on. The case 5 of the state 1 is such that both of the outputs of the first and second voltage comparators 2 and 3 are held at the low level within the minimum off-period, and the output of the first voltage comparator 2 then is inverted from the low level to high level due to the decrease of the output voltage of the DC-DC convertor after the minimum off-period, and thereafter the output of the second voltage comparator 3 is held at the low level while the coil current drive switching transistor 7 is held on after the turning-on thereof. There are several cases under the state 2 like that for the state 1. Hereinafter, a description is given for each case. In the case 1 of the state 2 where the output of the first voltage comparator 2 is always held at the high level, the second voltage comparator 3 inverts from the low level to the high level within the minimum off-period. In the case 2 of the state 2, the output of the second voltage comparator 3 is held at the low level within the minimum off-period, and then the output of the second voltage comparator 3 is inverted from the low level to the high level while the coil current drive switching transistor 7 is turned on. In the case 3 of the state 2, for instance, the output of the second voltage comparator 3 is held at the low level during either the minimum off-period or the on-period of the coil current switching transistor 7. Only a single case exists under the state 3 such that outputs of both the first and second voltage comparators 2 and 3 are held at the high level in all of the periods including the minimum off-period and the on-period of the coil current drive switching transistor 7.

Under the respective cases of the state 1, the case 1 of the state 2 and the single case of the state 3, the coil current drive switching transistor 7 has the longest fixed on-period per one cycle, which is labeled by the low level pulse width 2. Furthermore, the coil current drive switching transistor 7 has the shortest off-period per one cycle. The second waveform 69 of FIG. 8 shows a schematic of the output signal of the oscillating circuit in such a case. Under the case 1 of the state 1, the case 4 of the state 1, the case 2 of the state 2 and so on where the second voltage comparator 3 inverts from the low level to the high level while the coil current drive switching transistor 7 is turned on, the coil current drive switching transistor 7 has an actual on-period which is identical to or longer than the low level pulse width 1, and which is identical to or shorter than the low level pulse width 2. Particularly, in case that the second voltage comparator 3 inverts from the low level to the high level immediately before the coil drive switching transistor 7 turns off, the actual on-period of the coil current drive switching transistor 7 may not be so long due to an operation delay of the respective circuits. For example, in the case 4 of the state 1 and the case 5 of the state 1 where the output of the first voltage comparator 2 does not invert from the low level to the high level within the minimum off-period, the coil current drive switching transistor 7 has the off-period per one cycle time, which is longer than the minimum off-period. FIG. 18 show a list of the respective cases of the respective states which are described as above in detail. In the operation of the DC-DC converter, a particular case of a particular state may continue. Otherwise, different cases of different states may be mixed to each other. On average, the coil current drive switching transistor 7 has a relative on-period greater than a relative off-period as the DC-DC converter increases the output current. Accordingly, more energy is supplied from the coil 9 to the capacitor 11 through the diode 10 to thereby prevent the output voltage from falling even if the DC-DC converter provides a great amount of the DC-DC converter.

In embodiment 1 of the DC-DC converter according to the invention, the first voltage comparator 2 repeats the inversion operation to intermittently turn on the coil current drive switching transistor 7 at the narrow pulse width when the DC-DC converter feeds a relatively small output current. Accordingly, the coil stores a small amount of energy per one pulse to thereby reduce a ripple of the output voltage. Furthermore, in the case the DC-DC converter feeds a relatively great amount of the output current, the second voltage comparator 3 is inverted to turn on the coil current drive switching transistor 7 at the broad pulse width. Accordingly, the coil stores a great amount of the energy per one pulse to increase the energy amount transmitted to the output side, thereby preventing the fall of the output voltage. According to embodiment 1 of the invention, the DC-DC converter has a reduced ripple of the output voltage, an increased output current and a high energy conversion efficiency.

Figure 9:
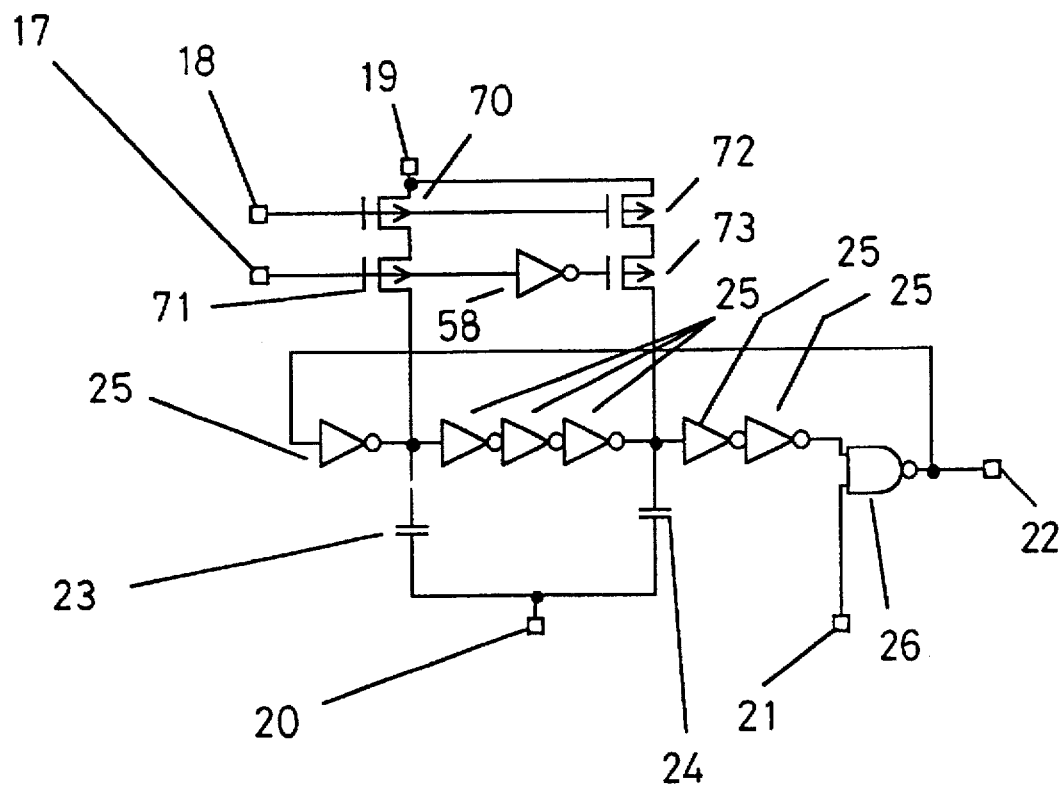
FIG. 9 is a circuit diagram of an oscillating circuit used in a first variation of embodiment 1 according to the invention.

FIG. 9 is a circuit diagram of an oscillating circuit contained in a first variation of embodiment 1 of the invention. The oscillating circuit shown in FIG. 9 is used in place of the oscillating circuit in FIG. 2. The variation has the same construction and connection of all of the circuits except for this oscillating circuit. The oscillating circuit includes a second voltage comparator output connecting terminal 17, a current bias output connecting terminal 18, a power source terminal 19 of the oscillating circuit, a ground terminal 20 of the oscillating circuit, a first voltage comparator output connecting terminal 21, an output terminal 22 of the oscillating circuit, an on-time setting capacitor 23, an off-time setting capacitor 24, constant current inverters 25, a NAND gate 26, an inverter 58, a first P channel transistor 70, a second P channel transistor 71, an third P channel transistor 72, and a fourth P channel transistor 73. In FIG. 9, the oscillating circuit comprises six constant current inverters 25 and one NAND gate 26, which are connected in a ring to constitute a ring oscillator similar to the one in FIG. 2. The difference between the oscillating circuit in FIG. 2 is that two pairs of P channel transistors 70, 71 and 72, 73, are connected in a series between the power source of the oscillating circuit and the respective output terminals of two constant current inverters 25 which are coupled with the on-time setting capacitor 23 and the off-time setting capacitor 24.

In the oscillating circuit of FIG. 9, in case that the output of the second voltage comparator 3 is held at the low level, the gate of the second P channel transistor 71 receives the low level signal through the second voltage comparator output connecting terminal 17. Therefore, the on-time setting capacitor 23 receives a sum of currents flowing through those of the last constant current inverter 25, the first P channel transistor 70 and the second P channel transistor 71. Furthermore, the gate of the fourth P channel transistor 73 is supplied with an inverted signal from the second voltage comparator so that the fourth P channel transistor 73 is held in the off-state. Therefore, the off-time setting capacitor 24 is charged by a current only flowing from the intermediate constant current inverter 25. Accordingly, the oscillating circuit outputs a low level signal of a short pulse width, and a high level signal of a pulse width having a relatively long minimum value. On the other hand, in the case that the output of the second voltage comparator is held at the high level, the gate of the second P channel transistor 71 receives the high level signal from the second voltage comparator output connecting terminal 17 so that the second P channel transistor 71 is turned off. Therefore, the on-time setting capacitor 23 receives a current only flowing through the last constant current inverter 25. Furthermore, the gate of the fourth P channel transistor 73 receives the inverted signal from the second voltage comparator so that the fourth P channel transistor 73 is turned on. Therefore, the off-time setting capacitor 24 receives the sum of the currents flowing through those of the intermediate constant current inverter 25 and the third and fourth P channel transistors 72, 73. Accordingly, the oscillating circuit produces a low level signal having a long pulse width and a high level signal having a short minimum pulse width at the output terminal 22. Furthermore, the on-time setting capacitor 23 and the off-time setting capacitor 24 may have the same capacitance, and the first P channel transistor 70 for setting the current value added to the on-time setting capacitor 23 has the same conductivity as that of the third P channel transistor 72 for setting the current value added to the off-time setting capacitor 24. In such a case, an increase of the low level pulse width output from the oscillating circuit when the output of the second voltage comparator is changed from the low level to the high level is made identical to a decrease of the high level pulse width. Consequently, the highest oscillating frequency of the oscillating circuit is made identical both where the first voltage comparator alone is inverted and where the second voltage comparator is also inverted. Namely, in the first variation of embodiment 1, the highest oscillating frequency of the oscillating circuit is made constant regardless of the output current condition of the DC-DC converter.

Figure 10:
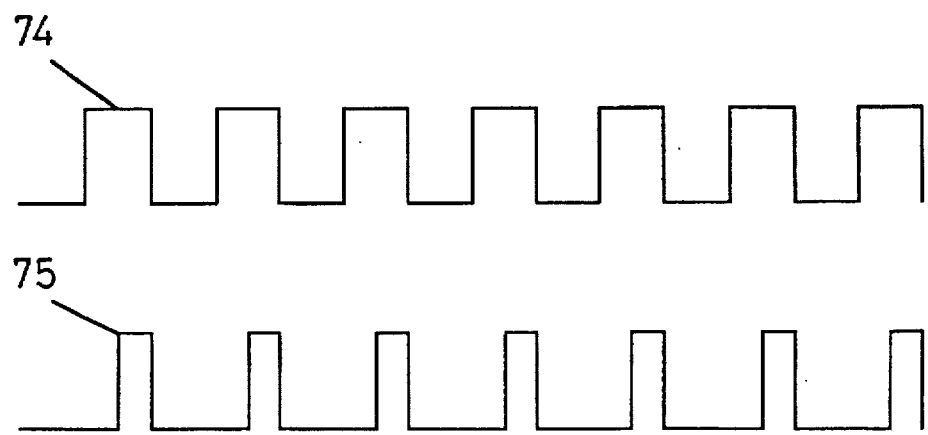
FIG. 10 is an output waveform diagram of the oscillating circuit used in the first variation of the embodiment 1 according to the invention.

FIG. 10 shows output waveforms 74, 75 of the oscillating circuit observed in a case where the first voltage comparator 2 alone is inverted and another case where both the first and second voltage comparators 2 and 3 are inverted. The waveform 74 shows the signal of the output terminal 22 of the oscillating circuit when the first voltage comparator 2 alone is inverted and the oscillating frequency reaches the maximum value. The other waveform 75 shows the signal at the output terminal 22 of the oscillating circuit when both the first and second voltage comparators 2 and 3 are inverted within the minimum off-period.

Figure 11:
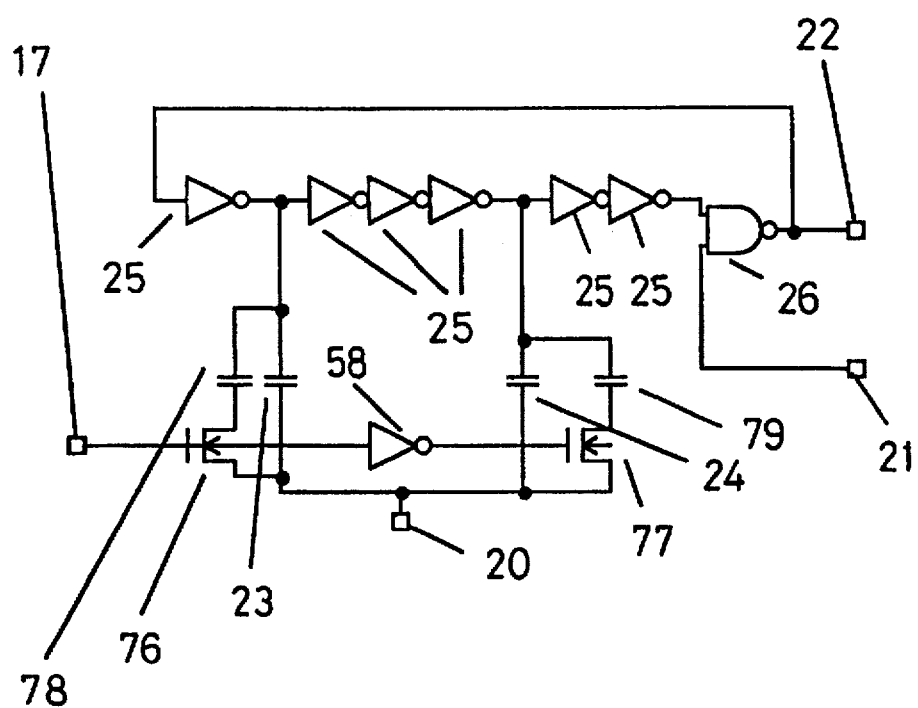
FIG. 11 is a circuit diagram of an oscillating circuit used in a second variation of the embodiment 1 according to the invention.

FIG. 11 is a circuit diagram of an oscillating circuit contained in a second variation of embodiment 1 of the invention. The oscillating circuit shown in FIG. 11 is used in place of the oscillating circuit in FIG. 2. The second variation has the same construction and connection of all of the circuits except for the oscillating circuit. The oscillating circuit includes a second voltage comparator output connecting terminal 17, a ground terminal 20 of the oscillating circuit, a first voltage comparator output connecting terminal 21, an output terminal 22 of the oscillating circuit, a first on-time setting capacitor 23, a first off-time setting capacitor 24, constant current inverters 25, a NAND gate 26, an inverter 58, a first N channel transistor 76, a second N channel transistor 77, a second on-time setting capacitor 78, and a second off-time setting capacitor 79. In FIG. 11, the oscillating circuit comprises of six constant current inverters 25 and one NAND gate 26, which are connected in a ring to constitute a ring oscillator similar to the one in FIG. 2. The difference between the oscillating circuit in FIG. 2 is that a pair of P channel transistors 27 and 28 connected in series are deleted between the output of the constant current inverter and the power source of the oscillating circuit, and in place thereof a second on-time setting capacitor and an N channel transistor 76 are connected parallel to the first on-time setting capacitor 23, and the second off-time setting capacitor 79 and a second N channel transistor 77 are connected parallel to the first off-time setting capacitor 24. The gate of the first N channel transistor 76 is connected to the second voltage comparator output connecting terminal 17. When the output of the second voltage comparator is inverted to the high level, the first N channel transistor 76 is turned on. Accordingly, the second on-time setting capacitor 78 is added to the original or primary on-time setting capacitor 23 to form a composite on-time setting capacitor having a great equivalent capacitance. Therefore, the oscillating circuit produces at the output terminal 22 a low level signal having an extended pulse width. On the other hand, the gate of the second N channel transistor 77 is input with an inverted level of a signal received at the second voltage comparator output connecting terminal 17. Therefore, when the output of the second voltage comparator is inverted to the high level, the second N channel transistor 77 is turned off so that the second off-time setting capacitor 79 is decoupled from the primary off-time setting capacitor 24. Consequently, the value of the composite off-time setting capacitor is equivalently reduced so as to reduce a width of the high level pulse produced from the output terminal 22 of the oscillating circuit. Namely, the oscillating circuit of FIG. 11 operates in the same manner as the oscillating circuit of FIG. 9 used in the first variation of embodiment 1. Accordingly, the oscillating circuit of FIG. 11 can be used in place of the oscillating circuit of FIG. 9 such that the DC-DC converter can be operated in the same manner as in the first variation of embodiment 1.

In the embodiment 1, the output voltage of the DC-DC converter is transmitted to the first and second voltage comparators through the output voltage feedback circuit. However, the output voltage feedback circuit may be omitted while the output voltage feedback terminal 16 of the IC is connected to the inverted input terminals of the first and second voltage comparators 2 and 3. The output voltage of the DC-DC converter is directly input into the first and second voltage comparators. In the embodiment 1, the coil current drive switching transistor 7 is provided within the IC. However, the switching transistor may be provided outside the IC. A bipolar transistor may be used in place of the MOS transistor. In the embodiment 1, the diode 10 is provided outside the IC. However, the diode may be provided inside the IC. Generally, a DC-DC converter of the boost type is altered to the voltage lowering type or the inversion type by changing the connection of the coil current drive switching transistor from a middle of the coil and the ground terminal to the middle of the coil and the power supply terminal. This embodiment may be altered to a DC-DC converter of the voltage lowering or inverting type as well in the general case.

Embodiment 2

Figure 12:
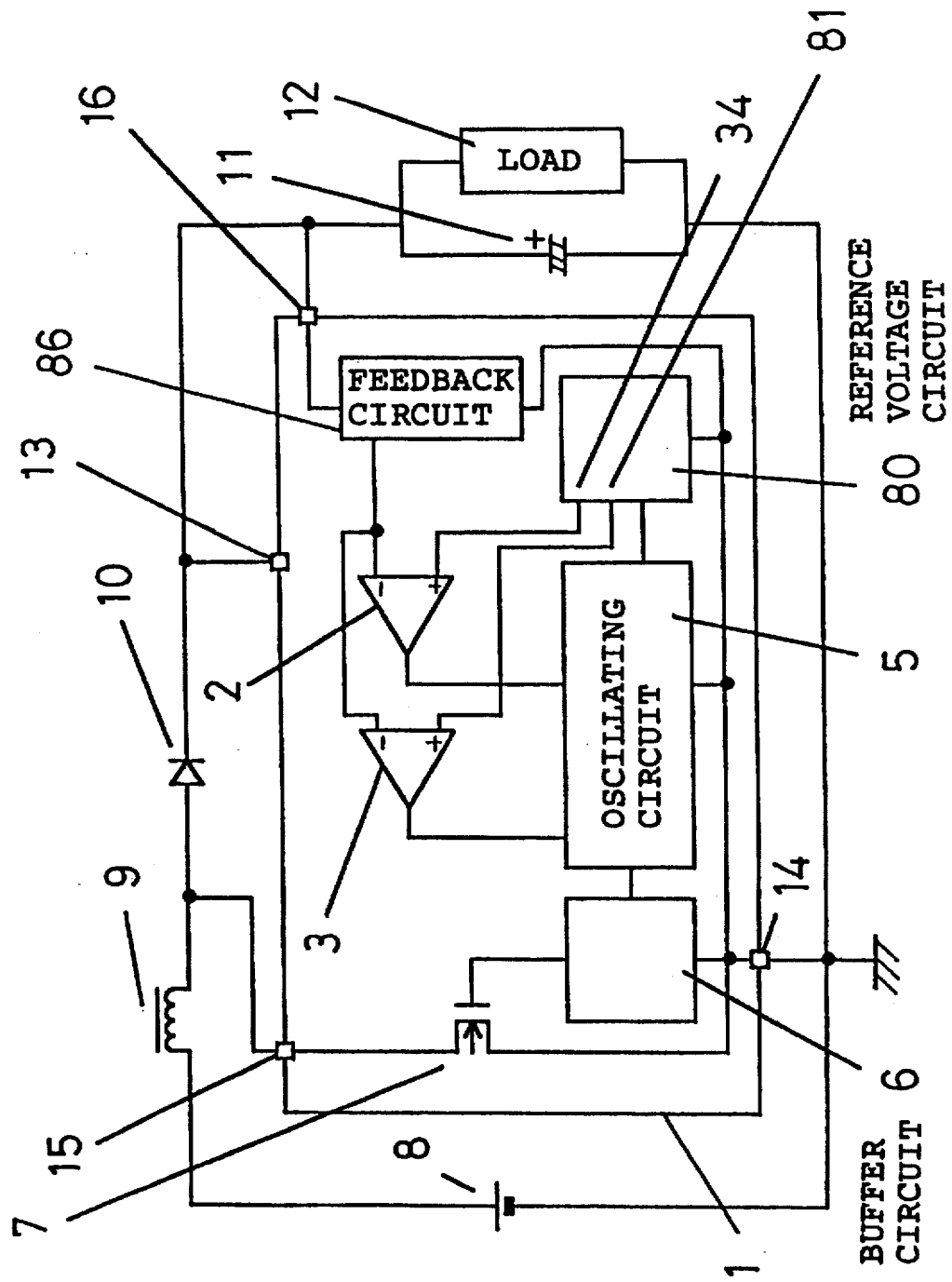
FIG. 12 is an overall circuit diagram showing an embodiment 2 of the invention.
Figure 13:
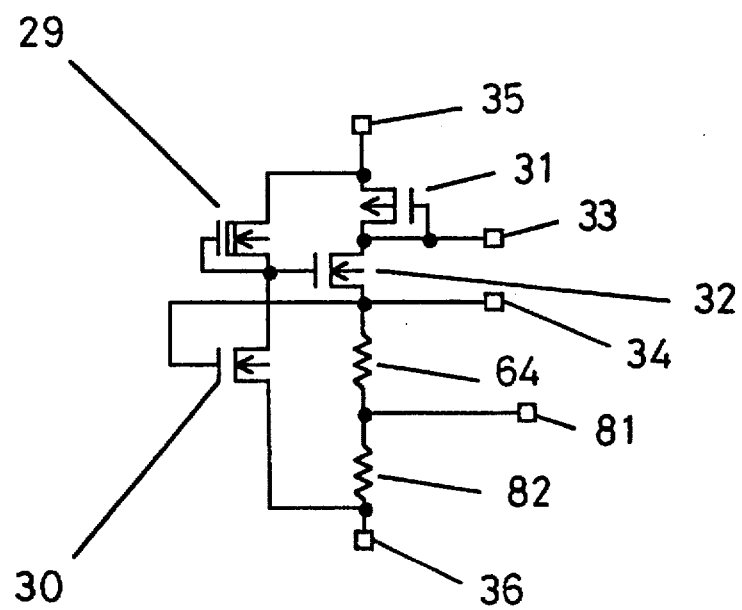
FIG. 13 is a circuit diagram of a reference voltage circuit used in embodiment 2 of the invention.

FIG. 12 is a circuit diagram of the embodiment 2 of the present invention. The DC-DC converter comprises a coil current driving IC, a first voltage comparator 2, a second voltage comparator 3, a different reference voltage circuit 80, an oscillating circuit 5, a buffer circuit 6, a coil current drive switching transistor 7, a voltage source 8, a coil 9, a diode 10, a capacitor 11, a load 12, a voltage supply terminal 13 of the IC, a ground terminal 14 of the IC, an output terminal 15 of the coil current drive IC, an output voltage feedback terminal 16 of the IC, and an output voltage feedback circuit 86. In the circuit of the embodiment 2 shown in FIG. 12, one terminal of the coil 9 is connected to a positive output terminal of the power source 8 similar to embodiment 1. Another terminal of the coil 9 is connected to an anode terminal of the diode 10, and to a drain terminal of the coil drive switching transistor 7 through the output terminal 15 of the coil current drive IC. A cathode terminal of the diode 10 is connected to the power source terminal 13 of the IC, the output voltage feedback terminal 16 of the IC, one terminal of the capacitor 11 and one terminal of the load 12. The ground is connected to another terminal of the load 12, another terminal of the capacitor 11, the ground terminal 14 of the IC, a source terminal of the coil drive switching transistor 7 and the negative terminal of the power source 8. FIG. 13 is a circuit diagram of the reference voltage circuit 80 used in the embodiment 2 of the invention. The circuit comprises a first N channel transistor 29, a second N channel transistor 30, a P channel transistor 31, a third N channel transistor 32, a current bias output terminal 33, a reference voltage output terminal 34, a power supply terminal 35, a ground terminal 36, a first resistor 64, a second reference voltage output terminal 81, and a second resistor 82. In FIG. 13, a group consisting of the first and second N channel transistors 29, 30 are connected in series between the power supply terminal 35 and the ground terminal 36 of the reference voltage circuit. Another group consisting of the P channel transistor 31, the third N channel transistor 32 and the first and second resistors 64, 82 are also connected in series between the power supply terminal 35 and the ground terminal 36. The first N channel transistor 29 is a depletion type, and a gate and a source thereof are connected to each other. A gate of the third N channel transistor 32 is connected to a source and a gate of the first N channel transistor 29. A gate of the P channel transistor 31 is connected to a drain of the first N channel transistor 29, and to a drain of the third N channel transistor 32. The source of the third N channel transistor 32 is connected to the first resistor 64. The reference voltage circuit of FIG. 13 produces a constant reference voltage at the first reference voltage output terminal 34, and produces at the second reference voltage output terminal 81 another reference voltage which is slightly lower than the first-mentioned reference voltage by several mili-volts to several tens of mili-volts. Furthermore, a gate bias voltage of the P channel transistor 31 is retrieved from the current bias output terminal 33. The third P channel transistor 31 receives the gate voltage bias voltage at its own gate so as to flow the constant current. Furthermore, a value of the constant current is freely controlled by setting a channel length and a channel width of the P channel transistor 31 which receives the gate bias voltage at its own gate.

Embodiment 2 has the same construction and the connection of the oscillating circuit, the buffer circuit and the output voltage feedback circuit as the embodiment 1, but the first reference voltage output terminal 34 of the reference voltage circuit 80 is connected to a non-inverted input terminal of the first voltage comparator 2, and the second reference voltage output terminal 81 of the same reference voltage circuit 80 is connected to a non-inverted input terminal of the second voltage comparator 3. In the embodiment 1, the electric conductivity of the transistor which constitutes the second voltage comparator is adjusted to provide a slight offset voltage for a comparing voltage of the second voltage comparator 3. In the embodiment 2, the first P channel transistor 47 of the second voltage comparator 3 of FIG. 6 has the same conductivity as the second P channel transistor 48. Namely, the comparing voltage of the second voltage comparator 3 does not have an offset since the conductivity of the transistor components is not adjusted. However, in the embodiment 2, the reference voltage input to the non-inverted input terminal of the second voltage comparator 3 from the reference voltage circuit is slightly lower than the voltage input into the non-inverted input terminal of the first voltage comparator 2 from the same reference voltage comparator. Therefore, the output terminal of the first voltage comparator 2 is inverted from the low level to the high level at a level higher than the second voltage comparator 3 when the output voltage of the DC-DC converter falls similar to the embodiment 1. Accordingly, the DC-DC converter of the embodiment 2 operates in the same manner as embodiment 1.

In the embodiment 2, the oscillating circuit of FIG. 9 is used to form the first variation, and the oscillating circuit of FIG. 11 is used to form the second variation in a manner similar to embodiment 1. Similar to the embodiment 1, the output voltage feedback circuit may be omitted. In embodiment 2, as in Embodiment 1, the coil current drive switching transistor is provided within the IC. However, the switching transistor may be provided outside the IC. A bipolar transistor may be used in place of the MOS transistor. In the embodiment 2, similar to embodiment 1, the diode 10 is provided outside the IC. However, the diode 10 may be provided inside the IC. Generally, a DC-DC converter of the boost type is altered to the voltage lowering type or the inversion type by changing the connection of the coil current drive switching transistor from the middle of the coil and the ground terminal to the middle of the coil and the ground terminal. Embodiment 2, similar to the embodiment 1, may be altered to a DC-DC converter of the voltage lowering or inverting type.

Embodiment 3

Figure 14:
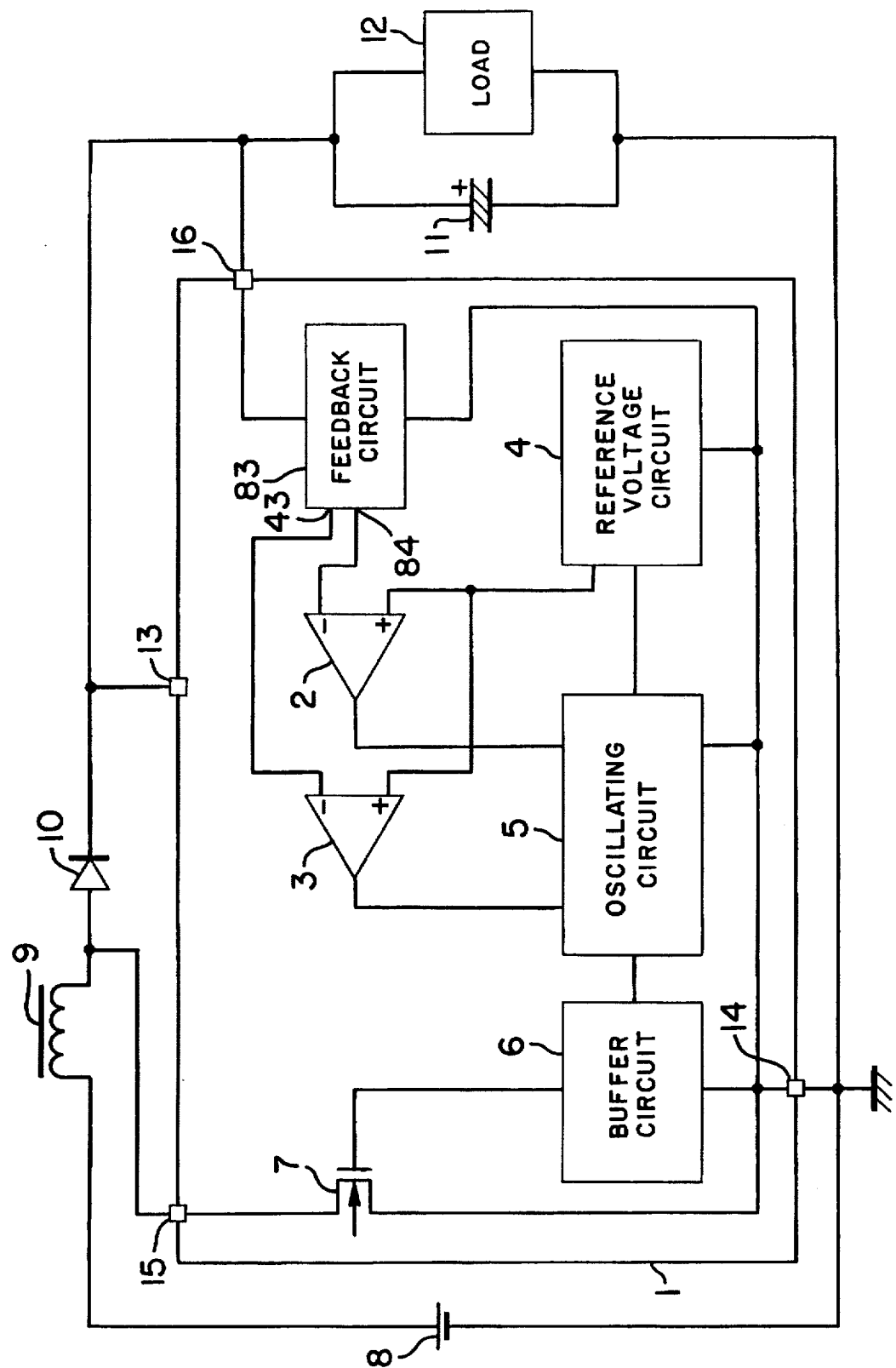
FIG. 14 is an overall circuit diagram of embodiment 3 of the invention.

FIG. 14 is a circuit diagram of embodiment 3 of the present invention. The DC-DC converter comprises a coil current driving IC 1, a first voltage comparator 2, a second voltage comparator 3, a reference voltage circuit 4, an oscillating circuit 5, a buffer circuit 6, a coil current drive switching transistor 7, a voltage source 8, a coil 9, a diode 10, a capacitor 11, a load 12, a voltage supply terminal 13 of the IC, a ground terminal 14 of the IC, an output terminal 15 of the coil current drive IC, an output voltage feedback terminal 16 of the IC, and a different output voltage feedback circuit 83. In the circuit of the embodiment 3 shown in FIG. 14, one terminal of the coil 9 is connected to the positive output terminal of the power source 8. Another terminal of the coil 9 is connected to the anode terminal of the diode 10, and to a drain terminal of the coil drive switching transistor 7 through the output terminal 15 of the coil current drive IC 1. The cathode terminal of the diode 10 is connected to the power source terminal 13 of the IC, the output voltage feedback terminal 16 of the IC, one terminal of the capacitor 11 and one terminal of the load 12. The ground is connected to the other terminal of the load 12, another terminal of the capacitor 11, the ground terminal of the IC 1, a source terminal of the coil drive switching transistor 7 and the negative terminal of the power source 8.

FIG. 15 is a circuit diagram of the output voltage feedback circuit 83 used in the embodiment 3 of the invention. The feedback circuit includes a first feedback resistor 39, a second feedback resistor 40, an input terminal 41, a ground terminal 42, a first output terminal 43, a voltage feedback capacitor 44, a third feedback resistor 85, and a second output terminal 84. The output voltage of the DC-DC converter is divided by the first, second and third feedback resistors 39, 40 and 85 to provide at the first output terminal 43 a voltage proportional to the output voltage of the DC-DC converter. Furthermore, the second output terminal 84 of the output voltage feedback circuit produces a voltage which is slightly lower than the voltage at the first output terminal 43 of the feedback circuit due to a voltage drop by the third feedback resistor 85. The value of the third feedback resistor 85 is set such that the voltage drop by the third feedback resistor 85 is in the order of several mili-volts to several tens of mili-volts. The voltage feedback capacitor 44 is optionally added to quickly transmit variation of the output voltage of the DC-DC converter to the output terminals of the output voltage feedback circuit similar to the voltage feedback circuit of FIG. 5. The value of the feedback capacitor 44 is suitably set according to the response of the DC-DC converter.

Embodiment 3 has the same construction and the same connection of the oscillating circuit, the reference voltage circuit and the buffer circuit as embodiment 1, but the first output terminal 43 of the output voltage feedback circuit 83 is connected to an inverted input terminal of the second voltage comparator 3 and the second output terminal 84 of the same output voltage feedback circuit 83 is connected to an inverted input terminal of the first voltage comparator 2. In the embodiment 1, the electric conductivity of the transistor which constitutes the second voltage comparator 3 is adjusted to provide a slight offset voltage for a comparing voltage of the second voltage comparator 3. In the embodiment 3, the first P channel transistor 47 of the second voltage comparator of FIG. 6 has the same conductivity as the second P channel transistor 48. Namely, the comparing voltage of the second voltage comparator 3 does not have an offset since the conductivity of the transistor components is not adjusted. However, in the embodiment 3, the voltage input to the inverted input terminal of the second voltage comparator 3 from the first output terminal 43 of the feedback circuit is slightly higher than the voltage input into the inverted input terminal of the first voltage comparator 2 from the second output terminal 84 of the same feedback circuit. Therefore, the output terminal of the first voltage comparator 2 is inverted from the low level to the high level at a level higher than the second voltage comparator 3 when the output voltage of the DC-DC converter falls similar to embodiment 1. Accordingly, the DC-DC converter of the embodiment 3 operates in the same manner as the embodiment 1.

In embodiment 3, similar to the embodiment 1, the coil current drive switching transistor 7 is provided within the IC 1. However, the switching transistor 7 may be provided outside the IC. A bipolar transistor may be used in place of the MOS transistor. In the embodiment 3, similar to embodiment 1, the diode 10 is provided outside the IC. However, the diode 10 may be provided inside the IC. Generally, a DC-DC converter of the boost type is altered to the voltage lowering type or the inversion type by changing the connection of the coil current drive switching transistor 7 from the middle of the coil 9 and the ground terminal 14 to the middle of the coil 9 and the power supply terminal 13. Embodiment 3, like the embodiment 1, may be altered to the DC-DC converter of the voltage lowering or inverting type.

Embodiment 4

Figure 16:
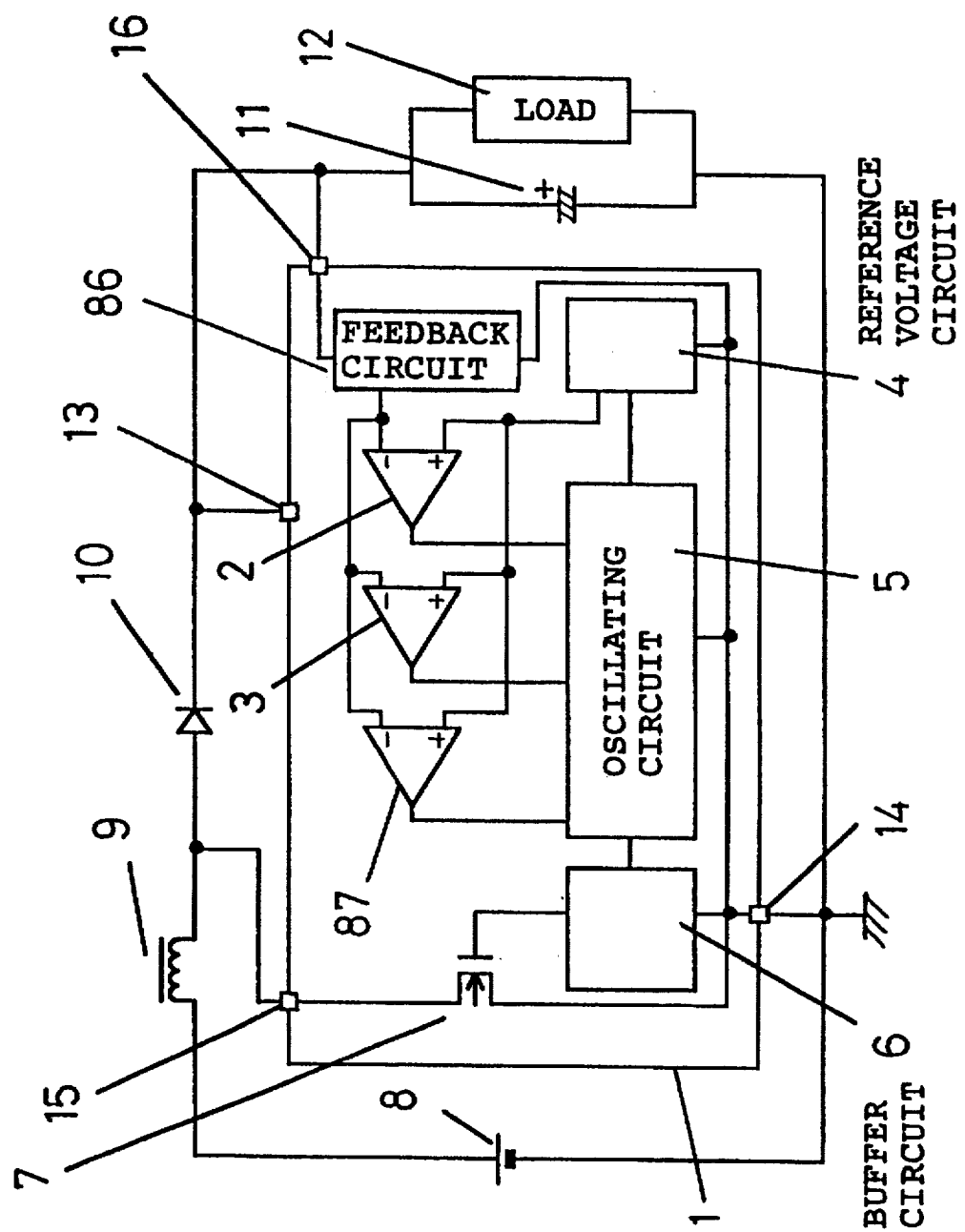
FIG. 16 is an overall circuit diagram of an embodiment 4 of the invention.

FIG. 16 is a whole circuit diagram showing the embodiment 4 of the DC-DC converter. This embodiment is basically similar to the embodiment 1 of FIG. 1. Corresponding elements are labeled with the same reference numerals to facilitate understanding of the figure. The difference is that a third voltage comparator 87 is provided in this embodiment to sequentially detect variation of the output voltage at three levels so as to achieve more fine control of the output voltage.

Figure 17:
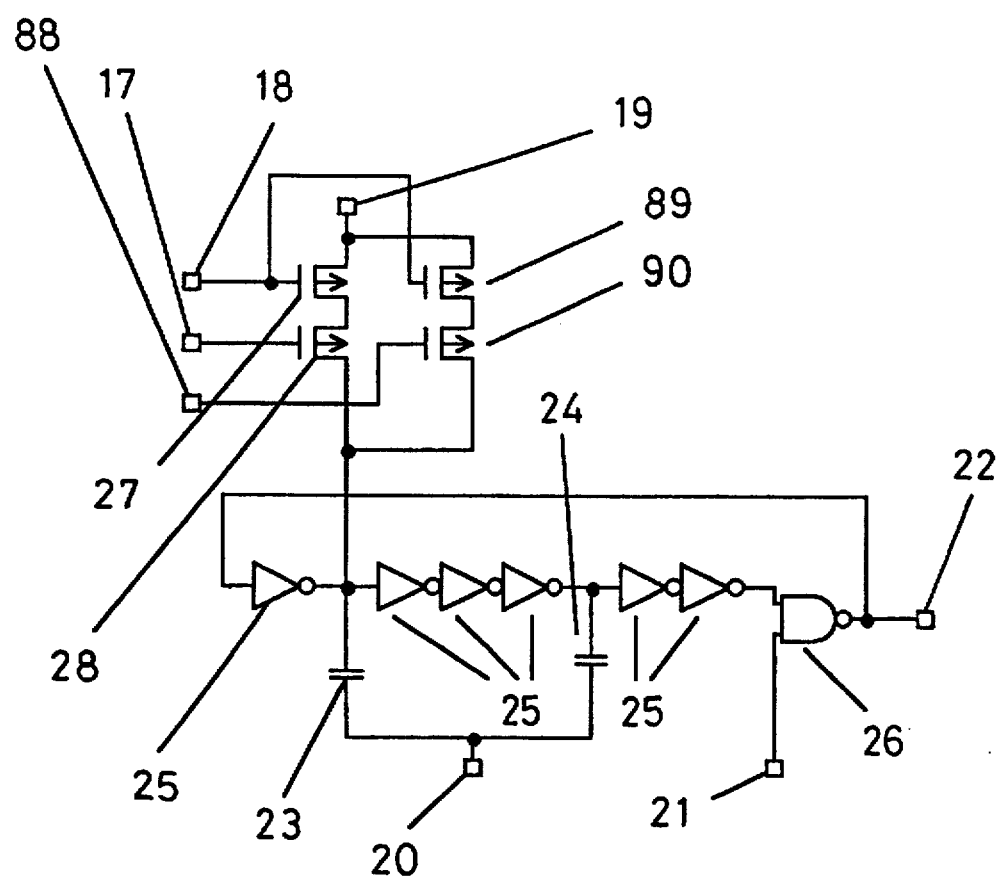
FIG. 17 is a circuit diagram of an oscillating circuit contained in the embodiment 4 of the invention.

FIG. 17 is a circuit diagram showing the detailed construction of the oscillating circuit 5 integrated into the embodiment 4 shown in FIG. 16. Basically, this circuit is similar to the oscillating circuit of FIG. 2 integrated into embodiment 1. The corresponding elements are labeled by the same reference numerals to facilitate understanding of the figure. The difference is that a third voltage comparator output connecting terminal 88 is provided. And connection thereto, a third P channel transistor 89 and a fourth P channel transistor 90 are provided. In the figure, when the output of the second voltage comparator 3 is inverted, the second P channel transistor 28 is turned off so that a changing path of the on-time setting capacitor 23 is partly blocked, whereby the output low-level pulse width of the oscillating circuit is expanded. When the output voltage falls further, the output of the third voltage comparator 87 is inverted to turn off the fourth channel transistor 90 so that the charging path to the on-time setting capacitor 23 is almost blocked except for the last constant current inverter 25, whereby the output low level pulse width of the oscillating circuit is still further expanded.

As described in conjunction with the embodiments 1, 2, 3, and 4, the DC-DC converter comprises at least a first voltage comparator for detecting a first voltage level, a second voltage comparator for detecting a second voltage level, a reference voltage circuit, an oscillating circuit, an output voltage level feedback circuit, a buffer circuit and a coil current drive switching transistor. By such a construction, the coil current drive switching transistor is turned to drive a coil current to control an output voltage during a first pulse width when the first voltage comparator detects the output voltage, and the coil current drive switching transistor is turned on to drive a coil current to control the output voltage during a second pulse width when the second voltage comparator detects the output voltage. By such a construction, the output voltage is controlled by changing the pulse width according to the degree of decrease in the absolute value of the output voltage. Consequently, the invention realizes a DC-DC converter having a reduced ripple of the output voltage, a great current generation capacity and a highly efficient energy conversion rate, by voltage control by setting a plurality of pulse widths according to the variation of the output voltage.

What is claimed is:

1. A PFM type DC-DC converter comprising: a first voltage comparator for detecting a first voltage level; a second voltage comparator for detecting a second voltage level; a reference voltage circuit for producing one or more reference voltages and for providing a respective reference voltage to each of the first and second voltage comparators; an oscillating circuit for generating a control signal having one of a first pulse width and a second pulse width depending upon outputs of the first and second voltage comparators; and a coil current drive switching device controlled by the control signal, wherein the coil current drive switching device is turned on to drive a coil current to control an output voltage of the DC-DC converter during the first pulse width when the first voltage comparator detects that the output voltage or a fed back portion of the output voltage corresponds to the first voltage level, such that an output of the first voltage comparator controls the pulse width of respective pulses of the control signal, and wherein the coil current drive switching device is turned on to drive a coil current to control an output voltage during the second pulse width when the second voltage comparator detects that the output voltage or a fed back portion of the output voltage corresponds to the second voltage level, such that an output from the second voltage comparator controls the pulse width of respective pulses of the control signal, whereby the output voltage is controlled by changing the pulse width and the frequency of the control signal according to a degree of decrease in an absolute value of the output voltage.

2. A PFM type DC-DC converter according to claim 1; wherein the absolute value of the second voltage level is lower than the absolute value of the first voltage level, the second pulse width is wider than the first pulse width, and the conductivity of a transistor which constitutes either of the first and second voltage comparators differs from the conductivity of another transistor which constitutes the other of the first and second voltage comparators such that an offset voltage is added to a detection voltage of one of the first and second voltage comparators, whereby the first voltage comparator detects the first voltage level and the second voltage comparator detects the second voltage level.

3. A PFM type DC-DC converter according to claim 1; wherein the absolute value of the second voltage level is lower than the absolute value of the first voltage level, the second pulse width is wider than the first pulse width, the reference voltage circuit generates a pair of output voltages corresponding to the first and second voltage levels, a first reference voltage corresponding to the first voltage level being input into the first voltage comparator and a second reference voltage corresponding to the second voltage level being input into the second voltage comparator, and the first voltage comparator detects the first voltage level by producing an output signal that inverts from a first polarity to a second polarity when the output voltage or the fed back portion of the output voltage coincides with the first voltage level and the second voltage comparator detects the second voltage level by producing an output signal that inverts from a first polarity to a second polarity when the output voltage or the fed back portion of the output voltage coincides with the second voltage level.

4. A PFM type DC-DC converter according to claim 1; further comprising an output voltage feedback circuit for feeding back a portion of the output voltage to the first and second voltage comparators, and wherein the absolute value of the second voltage level is lower than the absolute value of the first voltage level, the second pulse width is wider than the first pulse width, and the output voltage feedback circuit outputs two different voltages corresponding to the output voltage so that the first voltage comparator is supplied with a first feedback voltage and the second voltage comparator is supplied with a second feedback voltage having a higher absolute value with respect to the output voltage than does the first feedback voltage, whereby the output voltage is controlled by changing the pulse width and frequency of the control signal according to a degree of decrease in the output voltage.

5. A PFM type DC-DC converter according to claim 1; wherein the output voltage is fed back to the first and second voltage comparators, and the reference voltage circuit outputs a reference voltage which coincides with the output voltage of the DC-DC converter within a given deviation therefrom and supplies the reference voltage to each of the first and second voltage comparators.

6. A PFM type DC-DC converter for intermittently driving a coil interposed between a load and a voltage source having a given supply voltage so as to feed a constant output voltage to the load, comprising: detecting means for detecting the output voltage and outputting a first detection signal when the output voltage is at a first level and a second detection signal when the output voltage is at a second level; oscillating means for producing a control signal in response to the first and second detection signals, the control signal having a duty ratio which varies from a smaller amount to a greater amount when the first detection signal is first input to the oscillating means and the second detection signal is subsequently input to the oscillating means; and switching means connected to the coil and being turned on and off according to the duty ratio of the control signal to intermittently drive the coil and to thereby control a variation of the output voltage.

7. A PFM type DC-DC converter according to claim 6; wherein the detecting means comprises a first voltage comparator for comparing the output voltage with a first reference voltage to detect the first level, and a second voltage comparator for comparing the output voltage with a second reference voltage to detect the second level.

8. A PFM type DC-DC converter according to claim 7; wherein the first and second voltage comparators comprise transistors having a different electric conductivity so as to selectively detect the first and second levels according to the difference in the electric conductivity.

9. A PFM type DC-DC converter according to claim 7; wherein the detecting means includes reference voltage generating means for generating different reference voltages and providing a respective reference voltage to the first and second voltage comparators according to voltage levels to be detected by the first and second voltage comparators.

10. A PFM type DC-DC converter according to claim 7; wherein the detecting means includes feedback circuit means for feeding back the output voltage while adding thereto an offset to the first and second voltage comparators so as to enable the first and second voltage comparators to separately detect the first and second levels of the output voltage.

11. A PFM type DC-DC converter comprising: a first voltage comparator for detecting a first voltage level; a second voltage comparator for detecting a second voltage level; a reference voltage circuit for producing one or more reference voltages and for providing a respective reference voltage to each of the first and second voltage comparators; an oscillating circuit for generating a control signal having one of a first pulse width and a second pulse width depending upon outputs of the first and second voltage comparators; and a coil current drive switching device controlled by the control signal; wherein the coil current drive switching device is turned on to control an output voltage of the DC-DC converter for a duration of time equal to the first pulse width when the first voltage comparator detects the first voltage level, and the coil current drive switching device is turned on to control the output voltage for a duration of time equal to the second pulse width when the second voltage comparator detects the second voltage level, such that outputs from the first and second voltage comparators control the pulse width of respective pulses of the control signal and the output voltage of the DC-DC converter is controlled by changing the pulse width and the frequency of the control signal according to the degree of decrease in an absolute value of the output voltage.

12. A PFM type DC-DC converter according to claim 11; wherein a divided portion of the output voltage of the DC-DC converter is supplied to the first and second voltage level comparators, and the first and second voltage level comparators compare the divided portion of the output voltage with the respective reference voltages supplied thereto.

13. A PFM type DC-DC converter according to claim 12; wherein the absolute value of the second voltage level is lower than the absolute value of the first voltage level, the second pulse width is wider than the first pulse width, and the conductivity of a switching device used in either of the first and second voltage comparators differs from the conductivity of another switching device used in the other of the first and second voltage comparators such that an offset voltage is added to a detection voltage of one of the first and second voltage comparators, whereby the first voltage comparator detects the first voltage level and the second voltage comparator detects the second voltage level.

14. A PFM type DC-DC converter according to claim 12; wherein the absolute value of the second voltage level is lower than the absolute value of the first voltage level, the second pulse width is wider than the first pulse width, the reference voltage circuit generates a pair of output voltages corresponding to the first and second voltage levels, a first reference voltage corresponding to the first voltage level being input into the first voltage comparator and a second reference voltage corresponding to the second voltage level being input into the second voltage comparator, and the first voltage comparator detects the first voltage level by producing an output signal that inverts from a first polarity to a second polarity when the output voltage or the fed back portion of the output voltage coincides with the first voltage level and the second voltage comparator detects the second voltage level by producing an output signal that inverts from a first polarity to a second polarity when the divided output voltage coincides with the second voltage level.

15. A PFM type DC-DC converter according to claim 11; wherein the output voltage is fed back directly to the first and second voltage comparators, and the reference voltage circuit outputs a reference voltage which coincides with the output voltage of the DC-DC converter within a given deviation therefrom and supplies the reference voltage to each of the first and second voltage comparators.

16. A PFM type DC-DC converter according to claim 11; wherein the control signal has a duty ratio which varies from a smaller amount to a greater amount when the first detection signal is first input to the oscillating means and the second detection signal is subsequently input to the oscillating means; and wherein the coil current drive switching device is turned on and off according to the duty ratio of the control signal to intermittently drive the coil and to thereby control variation of the output voltage.

17. A PFM type DC-DC converter according to claim 16; wherein the first and second voltage comparators comprise transistors having a different electric conductivity so as to selectively detect the first and second levels according to the difference in electric conductivity.

* * * * *